Jan. 27, 1931.  W. M. HOWSER  1,790,378
VALVE TOOL
Filed Sept. 12, 1927   2 Sheets-Sheet 2

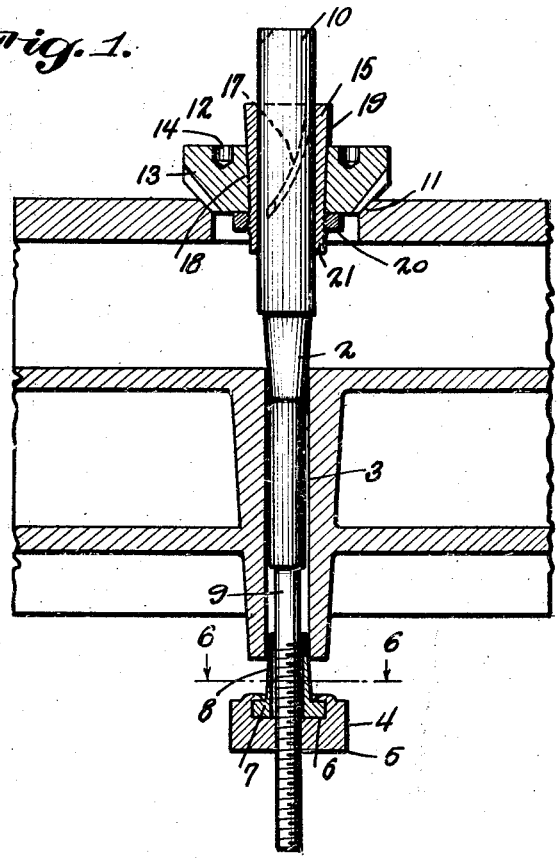
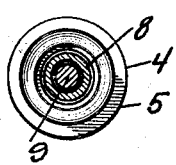
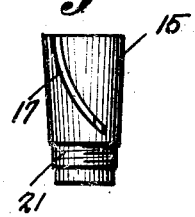
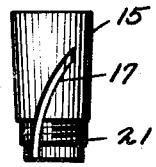

Inventor
Walter M. Howser
By Richard B. Owen
Attorney

Witnesses

Patented Jan. 27, 1931

1,790,378

UNITED STATES PATENT OFFICE

WALTER M. HOWSER, OF LA PORTE, INDIANA, ASSIGNOR TO HOWSER VALVE TOOL MANUFACTURING COMPANY, OF LA PORTE, INDIANA

VALVE TOOL

Application filed September 12, 1927. Serial No. 219,119.

This invention relates to a valve tool and has for its primary object the construction of a tool that is self centering when associated with a valve seat and permanently held stationary during the manipulation of the cutting tool.

An object of the invention is the construction of a tool of two major parts, one stationary during the entire operation of the tool, the other capable of rotary and rectilinear movements so as to properly and effectively engage the valve seat for the proper machining thereof.

Another object of the invention is the arrangement of an adjustable bushing or bearing structure so that all wear can be accurately compensated for thereby assuring accurate operation of the tool.

Another object of the invention is the novel manner of constructing and assembling the component parts of the cutting device so that the various parts are connected together as a unit, so as to facilitate the connecting and disconnecting of the tool.

A feature of the invention is the novel manner of connecting the bushing with the tool element and with the pilot so that upon adjustment of a single element the frictional engagement between the bushing and the pilot may be varied as well as the frictional engagement between the bushing and tool element.

Besides the above my invention is distinguished in the novel manner of constructing and assembling the various parts so that friction between the movable parts may be accurately regulated, the changing of cutters facilitated and the requirement of refinement in manufacturing eliminated.

With these and other objects the invention will be better understood from the following detailed description taken in connection with the accompanying drawings, wherein:

Figure 1 is a vertical sectional view of the tool in applied position,

Figure 6 is a sectional view on the line 6—6 of Figure 1, and

Figures 7 and 8 are views of other forms of bushings that may be used on my invention.

Figure 2:
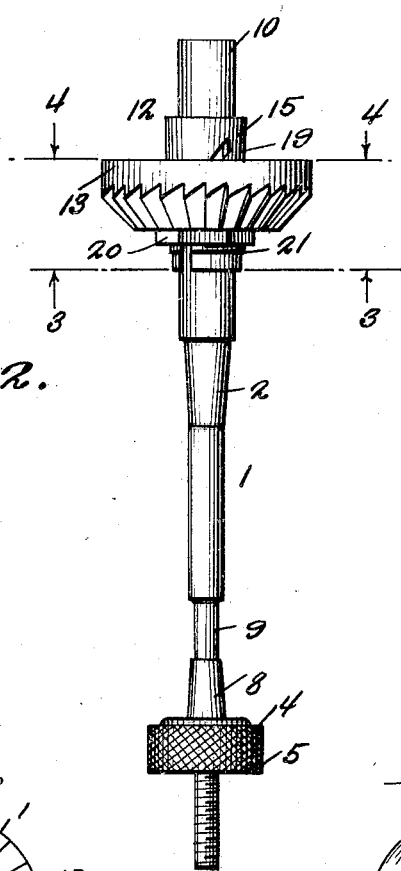
Figure 2 is a side elevation of the tool.
Figure 3:
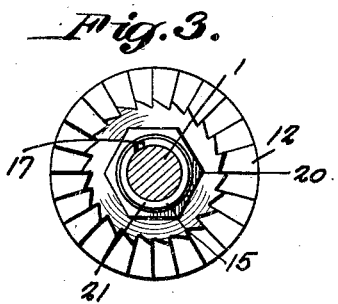
Figure 3 is a sectional view on the line 3—3 of Figure 2.
Figure 4:
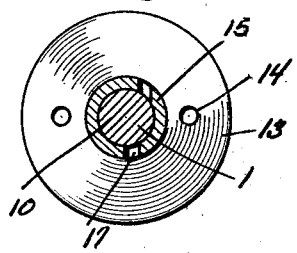
Figure 4 is a sectional view on the line 4—4 of Figure 2.

Again referring to the drawings illustrating one of the many constructions of my invention the numeral 1 designates the pilot or support designed to be self centering in its application to the valve seat structure and this pilot or support is held stationary during the operation of the tool. To accomplish these desired results the pilot is provided with the valve guide 3 while the other end of the valve guide 3 is engaged by a centering device 4 having adjustable relation with the conical bearing 2. The centering device 4 consists of a nut 5 provided with a recess 6 loosely receiving the flange 7 carried on a conical sleeve 8 that directly engages the associated end of the valve guide 3. The nut 5 is threaded on the shank 9 projecting from the conical bearing structure 2. This pilot 1 is also provided with a head 10 preferably of cylindrical formation centralized within the valve seat 11 by the bearing 2 with the valve guide 3. Thus it will be appreciated that the pilot does not have any connection whatsoever with the valve seat proper but is so positioned relative thereto as to be very readily accessible so as to facilitate the application and removal of my novel construction of cutting device designated in its entirety by the numeral 12 and now to be described.

This cutting device 12 in one of its embodiments consists of the rotary tool element 13 of the required configuration to properly engage and machine the valve seat 11. To accomplish rotary motion of the element 13 the latter is provided with tool engaging holes 14.

Figure 5:
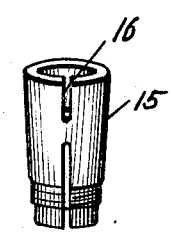
Figure 5 is a perspective view of one type of bushing.

As the efficient operation of the tool is dependent to a great extent upon the proper centering of the tool relative to the valve seat, it is of a decided advantage to provide means for compensating for wear and, thereby assure a neat fit between the movable and stationary parts. To accomplish this advantage, I provide a bushing or bearing construction 15 illustrated as of sleeve formation and provided with slots of any suitable configuration such as the rectangular slots 16 shown in Figure 5 and the arcuate slots 17 illustrated in Figures 1, 7 and 8. At this point I wish to call attention to the fact that the bushing or bearing structure may be constructed in various other manners than illustrated to have contractible properties to compensate for wear and assure a snug fit between the bushing and the head 10. There are various ways in which the bushing can be contracted for compensating for wear and obtaining an effective engagement between the bushing and head 10 but for the purpose of illustration I have shown the tool element 13 provided with a tapering bore 18 engageable with the tapering surface 19 of the bushing. It will be appreciated that by wedging the element 13 along the bushing the latter will be contracted around the head 10 due to the construction of the bushing. For the purpose of regulating the relative position of the bushing and tool element I have illustrated a clamp device or nut 20 threaded upon the extension 21 of the bushing and engageable with the tool element so that upon tightening of the nut or clamp the element 13 can be forced along the bushing for contracting the latter. Thus the nut 20 performs the dual function of regulating the frictional engagement between the tool element and the bushing and the frictional engagement between the bushing and the head 10, and besides effectively connects the tool element to the bushing as a unit so as to facilitate placement or removal of the cutting device upon the pilot.

In the use of the tool the pilot is first arranged in the valve guide 3 with the bearing 2 engageable with the wall of the valve guide and then the centering device 4 is adjusted thereby forcing the bearing 2 and centering device towards each other to accomplish an effective engagement between the valve guide and the pilot in a manner that the proper centering of the pilot is positively assured. With the head 10 properly centered within the valve seat 11 and projecting a predetermined distance thereabove it will be appreciated that the cutting device the component parts of which are connected together as a unit may be very readily slipped on to the head 10 to be moved to a position engageable with the valve seat 11. When this has been accomplished application of a tool into the holes 14 will enable the cutting device to be properly and effectively rotated for machining the valve seat 11 and if it is necessary to take up wear to increase the frictional engagement between the movable and stationary parts it is only necessary to give a few turns or partial turn to the nut or clamp device 20 for forcing the cutting element along the bushing which causes the latter to contract about the head 10 and increase the frictional engagement between the tool element and the bushing. This action assures the proper connection between the component parts and the proper centering of the tool relative to the valve seat.

From the foregoing description taken in connection with the accompanying drawings, it will be appreciated that I have designed a tool of a simplified construction having great durability in which the center of bearing is materially lowered thereby considerably increasing the efficiency of operation of the tool.

In concluding, I wish to call particular attention to the fact that the relative arrangement and construction of the component parts is such that the usual refinements in manufacture are eliminated thereby enabling greater production at lower cost and a considerable reduction in the price of the tool. It is, of course, to be understood that various parts may be designed in various other manners than illustrated and connected together in various other ways, and therefore, I do not desire to be limited in protection in any manner whatsoever except as set forth in the following claim.

What I claim is:

A valve tool comprising a pilot, means for centering and wedging the pilot against movement in a valve guide, a contractable bushing mounted on the pilot having its outer face tapering toward its lower end, a tool element having a bore corresponding to the tapered outer face of the bushing and receiving said bushing, means engaging the bushing and tool for contracting the bushing and adjusting the tool toward the enlarged end of the bushing, and means on the tool permitting the direct rotation thereof.

In testimony whereof I affix my signature.

WALTER M. HOWSER.